G. H. TRIPPLEHORN.
SPRING SUSPENSION FOR VEHICLES.
APPLICATION FILED MAR. 11, 1918.

1,279,614.

Patented Sept. 24, 1918.

Inventor
GEORGE H. TRIPPLEHORN

Witness

By

Attorney

UNITED STATES PATENT OFFICE.

GEORGE H. TRIPPLEHORN, OF DETROIT, MICHIGAN.

SPRING SUSPENSION FOR VEHICLES.

1,279,614.   Specification of Letters Patent.   Patented Sept. 24, 1918.

Application filed March 11, 1918. Serial No. 221,668.

*To all whom it may concern:*

Be it known that I, GEORGE H. TRIPPLEHORN, a citizen of the United States, residing at Detroit, county of Wayne, State of Michigan, have invented a certain new and useful Improvement in Spring Suspensions for Vehicles, and declare the following to be a full, clear, and exact description of the same, such as will enable others skilled in the art to which it pertains to make and use the same, reference being had to the accompanying drawings, which form a part of this specification.

This invention relates to spring suspension for vehicles, and its object is a device adapted for use in conjunction with the usual leaf spring for vehicles such as automobiles, acting as a shock absorber and of itself absorbing the lighter shocks incident to travel of the vehicle and allowing the heavier leaf spring to come into action to absorb the heavier shocks to which the vehicle body is subject. A particular object of the invention is a shock absorbing device providing a seat for the leaf spring and itself adapted to be secured to an axle and taking the place of the usual fixed seat for the leaf spring. The device is adapted for use with leaf springs of various types as either half, three quarters or full elliptic or cantaliver type. These objects and the several novel features of the invention are hereinafter more clearly described and claimed and shown in the accompanying drawings in which—

Figure 3:
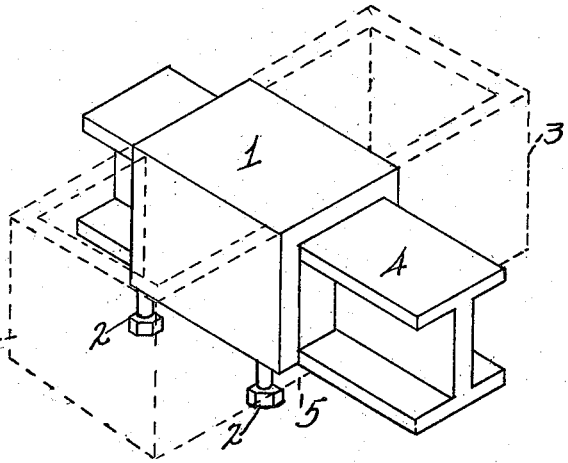
Fig. 3 is a view in perspective showing one mode of supporting the spring cases on the axle.

The device may be adapted for use with axles of various types and is here shown in conjunction with an axle of I-beam form in cross section, but it is to be understood that it may be fitted to axles of various shapes by simple alteration in a saddle 1, which in the construction shown, is adapted to fit over the axle and is substantially U shaped in form in the construction shown in the drawing. This saddle has at the edge of the two depending side members a pair of threaded bolts 2 provided with the usual nuts. What I have termed the spring cases are shown in dotted lines in Fig. 3 at 3. They are here shown as being rectangular in form providing, with the depending side members of the saddle, a rectangular box open at the upper end. It is to be understood, however, that these cases may be cylindrical in form or otherwise shaped as may be desired. A feature of these cases, however, is that they are fixedly supported on opposite sides of the axle. In the construction shown the two cases 3 on opposite sides of the axle 4 are connected together by a member 5 extending beneath the axle, which member is apertured to receive the bolts 2, which securely hold the cases in position and together with the saddle bind the parts in position on the axle. The manner of securing the spring cases to the axle is immaterial as various means may be employed without departing from the spirit of this invention.

Figure 1:
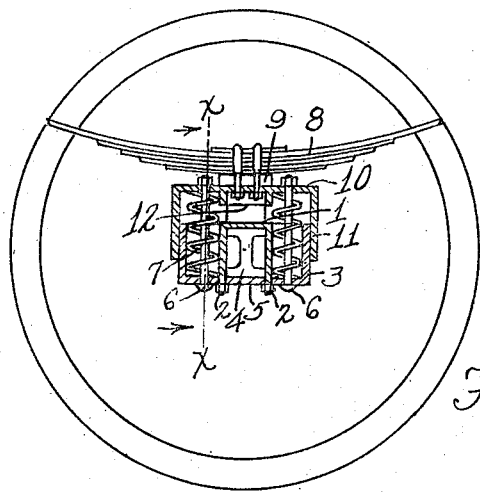
Figure 1 is a view in cross section showing my improved shock absorbing device on an axle.
Figure 2:
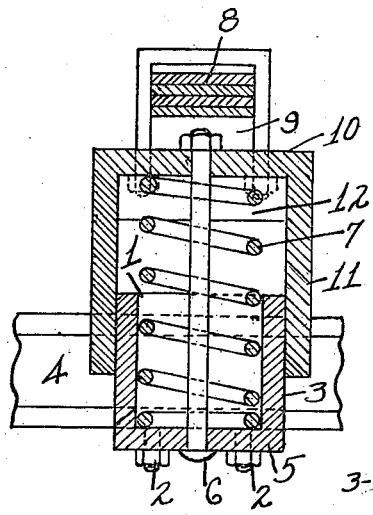
Fig. 2 is an enlarged section taken on line *x—x* of Fig. 1.

As will be understood from Figs. 1 and 2, the member 5 at the center of the bottom of either case 3 is apertured to receive the vertical bolt 6 extending upward therethrough and in the case is mounted the coiled spring 7 through the center of which the bolt extends.

In positioning the saddle 1 the usual seat for the leaf spring 8 is dispensed with, it being replaced by a seat 9 mounted on a member 10 having side and end portions 11 of substantially U form corresponding to the shape of the spring cases 3 and telescoping thereover. The leaf spring member 8 is thus fixedly mounted on the member 10 extending between the two telescoping members 11 for the spring cases as will be seen in Fig. 1. The member 10 to which the spring seat is attached is provided with a side flange 12 normally, by reason of the length of the springs 7, being some little distance above the axle member 4 and saddle 1. The bolt 6 extends upward through this cross member 10 of the telescoping parts of the spring case as is shown in Figs. 1 and 2 and is provided with a nut to retain the same in place.

The vehicle body (not here shown), carried by the spring member 8 is thus spring suspended by means of the springs 7 and any undue shock caused by road travel or otherwise is first absorbed by these springs 7. In case the springs 7 do not entirely absorb the shock, the side flanges 12 of the cross member 10 engage the axle on downward movement of the spring 8 and parts supported thereby, causing the shock to be absorbed by the leaf spring 8 which then is seated on the axle.

By rigidly fastening the spring 8, which may be of any type as heretofore stated, on a member which is also spring supported relative to the axle, a shock absorbing spring is provided that is inexpensive in form and efficient in operation and by arranging this member 10 with the parts 11 extending downward each side of the axle in telescopic relation with the spring cases, movement of the spring 8 and the seat therefor longitudinally of the vehicle is prevented, it being securely held from either longitudinal or transverse movement of the vehicle by the telescoping members 11 of the portion 10 and the bolts 6 provide a means for preventing the disengagement of the telescoping members under rebound shock.

I have here attempted to show only one type of construction of the spring cases and mode of securing to the axle, it being understood that various types of construction may be used for clamping the spring cases to the axle, the essential characteristic being that cases be provided to hold the coiled springs and telescoping members provided therefor on which the leaf spring is rigidly seated.

Having thus briefly described my invention what I claim and desire to secure by Letters Patent of the United States is—

1. A spring suspension for vehicles comprising in combination with an axle, a saddle substantially U-shaped in form fitting over the axle, a pair of spring receptacles having a cross member connecting the same at the bottom adapted to be secured to the ends of the said U-shaped saddle, a member having portions in telescopic relation with the spring receptacles, coiled springs in the said receptacles normally positioning the said member above the axle, a pair of bolts extending through the said member and respective spring receptacles limiting the extent of movement apart of said members, a spring seat carried by the said telescopic member and a spring greater in tension than the coiled springs seating thereon.

2. A spring suspension for vehicles comprising in combination with an axle and a leaf spring, a saddle substantially U shaped in form having vertical side members depending on each side of the axle and substantially in engagement therewith to prevent movement transversely of the axle, a pair of spring receptacles substantially rectangular in form connected together at the bottom by a cross member, the inner adjacent faces of the receptacles being open and the said cross member being adapted for attachment to the lower edge of the vertical side members of the saddle, said open sides of the receptacles being closed by the saddle when assembled therewith, a second pair of spring receptacles complemental to the first named pair and telescoping thereover, the said second receptacles being connected by a cross member and open on adjacent inner faces to allow movement of the first named receptacles thereinto, a coiled spring in said receptacles normally positioning the said second member above the axle, means for limiting the extent of upward movement of the coiled springs, and a seat for the leaf spring carried by the cross member of the said second pair of receptacles.

In testimony whereof, I sign this specification.

GEORGE H. TRIPPLEHORN.

Copies of this patent may be obtained for five cents each, by addressing the "Commissioner of Patents, Washington, D. C."